April 23, 1929.  D. OLIPHANT  1,710,488
AIR CONTROL FOR INTERNAL COMBUSTION ENGINES
Filed Oct. 9, 1926
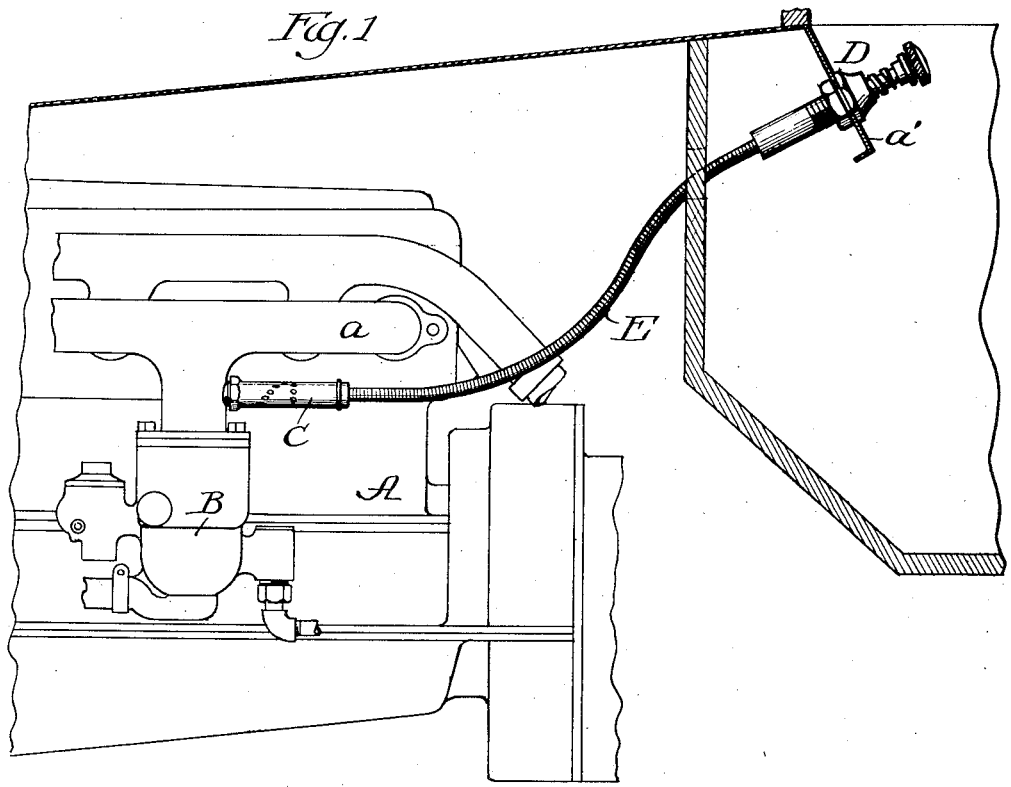
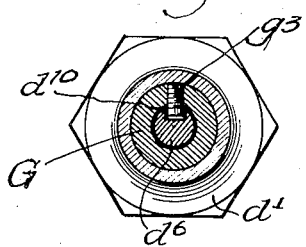
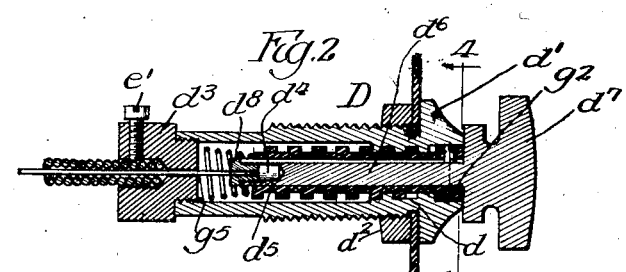
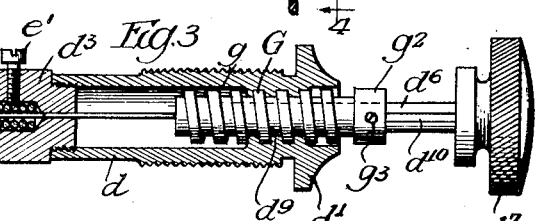
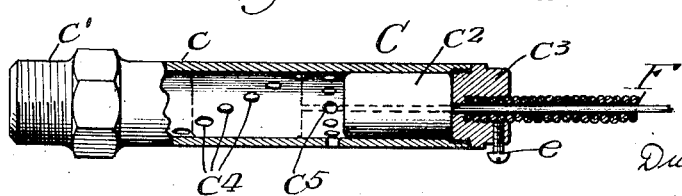
Inventor
Dudley Oliphant
By Fred Gerlach
Atty.

Patented Apr. 23, 1929.  1,710,488

UNITED STATES PATENT OFFICE.

DUDLEY OLIPHANT, OF DULWICH, SOUTH AUSTRALIA, AUSTRALIA.

AIR CONTROL FOR INTERNAL-COMBUSTION ENGINES.

Application filed October 9, 1926. Serial No. 140,542.

The invention relates to air controls for internal combustion engines used on motor driven vehicles.

One object of the invention is to provide a unitary device whereby the air admitted to the intake manifold of the engine may be set to regulate the mixture of the combustible fluid and which is quickly and readily operable to admit an excess of air when it is desired that the engine should act as a brake for the vehicle, without change in adjustment. By providing such a device, it becomes possible to control the excess of air desired when braking, while the adjustment for controlling air while the engine is running under a load remains fixed, so that at the conclusion of a braking operation the operator may readily restore the device to its correct adjustment for load conditions.

Another object of the invention is to provide an improved valve for controlling the admission of air to the intake of the engine which permits adjustment to accurately regulate the admission of air for varying load conditions, and to admit an excess of air when the motor is to be used as a brake for the vehicle.

The invention consists in the several novel features hereinafter set forth and more particularly defined by the claims at the conclusion hereof.

In the drawing: Fig. 1 is an elevation of the invention applied to a motor vehicle. Fig. 2 is a section of the controlling device, the parts being in position assumed when the valve is closed to cut off the admission of air to the engine. Fig. 3 is a section of said device, the regulating sleeve being shown in position for admitting a predetermined amount of air for load conditions and the handle for operating the valve in position to hold the valve in position to admit an excess amount of air. Fig. 4 is a section taken on line 4—4 of Fig. 2. Fig. 5 is a detail section of the air valve.

The invention is exemplified in connection with a motor vehicle equipped with an internal combustion motor A which is provided with an intake manifold $a$ to which the carburetor B is connected. The motor and carburetor may be of any suitable construction. An air valve C comprises a cylindrical casing $c$ which is provided with a screw-thread $c'$ at its open end which is threaded into the intake manifold $a$ and a valve plunger $c^2$ which is longitudinally slidable in the casing $c$. The other end of said casing is closed by a head $c^3$ which is threaded thereto. The wall of the casing $c$ is provided with a diagonal series of holes $c^4$ for effecting a fine regulation of the air admitted to the casing which is subjected to the suction from the motor and an annular series of holes $c^5$ which are adapted to admit an excess of air when the motor is being used to brake the vehicle, as for example when it is travelling down hill. In its innermost position, the plunger $c^2$ is adapted to close the holes $c^4$, so that no air will enter the casing $c$. As the plunger is drawn outwardly, it will progressively uncover the holes $c^4$, and when drawn to its extreme outward position, it will uncover the holes $c^5$ additionally. As a result, when the plunger is in the position shown by full lines in Fig. 5 sufficient air will be admitted through the casing $c$ to the intake manifold to prevent any substantial amount of vapor from being drawn into the manifold from the carburetor. By using this valve to admit the amount of air necessary to prevent the fuel from being drawn into the motor while the engine is braking the vehicle, the consumption of fuel during the braking periods may be prevented or reduced.

The controlling device D for the air admission valve C is located within convenient reach of the operator of the vehicle, being usually mounted on the instrument-board or plate $a'$ of the vehicle. This device comprises a cylindrical casing $d$ which is adapted to extend through a hole in the plate $a'$ and to be clamped in position thereon by a head or flange $d'$ at one end of the casing and a nut $d^2$ which is threaded to the casing so that the casing may be securely clamped to said plate. The front end of casing $d$ has screw-threaded thereto a plug $d^3$. A flexible sleeve E, usually formed of a coil of wire, has one of its ends secured by a screw $e$ in a socket in the head $c^3$ of the valve casing $c$ and its other end secured by a screw $e'$ in a socket formed in the head $d^3$ of casing $d$. A flexible wire F extends through sleeve E and has one of its ends fixedly connected to the valve plunger $c^2$. The sleeve E forms a guide for the wire F so that longitudinal movement of the wire will shift the valve plunger $c^2$ in the casing $c$. The other end of wire F has secured thereto a head $d^4$ which is confined in a socket $d^5$ formed at the inner end of a stem $d^6$ of an operating knob $d^7$. Head $d^4$ is held in socket $d^5$ so it will move longitudinally with the stem $d^6$ by plug $d^8$ which is screw-threaded into the inner end of the stem $d^6$ and provide with a hole through which the wire F extends. A sleeve G is normally disposed in the casing $d$ and is provided with a screw-thread $g$ on its outer periphery which extends through a coacting female thread $d^9$ formed on the inner periphery of the rear portion of the casing $d$. A head $g^2$ is formed on the outer end of the sleeve G which is adapted to abut against the end of the screw-thread $d^9$ to limit the inward movement of the sleeve. Rotation of sleeve G in one direction will, by reason of its threaded engagement with the casing $d$ move the head $g^2$ backwardly or outwardly while rotation in the reverse direction will shift the sleeve inwardly or forwardly. The stem $d^6$ of the operating knob $d^7$ is slidable longitudinally through the bore of the sleeve G, so that the wire F, which is connected to said stem, may be operated independently of the sleeve. Said stem is formed with a longitudinal groove $d^{10}$ which receives a stud $g^3$ which is threaded to sleeve G, so that rotation of the stem $d^6$ will impart rotation to the sleeve while the knob $d^7$ may be moved outwardly independently of the sleeve. Head $g^2$ on the sleeve is adapted to act as an adjustable stop for the knob $d^7$ to limit the forward or inward movement of the knob, so that the valve plunger $c^2$ may be set to uncover one or more of the openings $c^4$ to admit sufficient air to regulate the combustible mixture passing to the engine, while permitting the knob $d^7$ to be moved backwardly or outwardly to bring the valve plunger C into position to uncover the openings $c^5$ without changing the adjustment of the sleeve G. A spring $g^5$ may be interposed between head $d^3$ and the inner end of sleeve G to frictionally hold the latter in any position to which it is shifted. Head $d^4$ on wire F is rotatable in the socket $d^5$ so that knob $d^7$ may be turned without twisting the wire.

In operation, the knob $d^7$ when rotated will rotate the sleeve G which will gradually force the sleeve and the knob outwardly or inwardly according to the direction of rotation, so that the admission of air for regulating the mixture may be accurately regulated by gradually and progressively uncovering or covering the holes $c^4$ until it is found that the valve $c^2$ is in position to produce the desired mixture according to atmospheric or load conditions. When this point has been once determined, the sleeve G will be left in its adjusted position. Whenever it becomes desirable to admit an excess of air, so that the engine may operate to brake the vehicle, the operator will pull the knob $d^7$ backwardly or outwardly from the position in which it is held by the head $g^2$ of the sleeve G until the plunger $c^2$ strikes the head $c^3$ of the valve casing $c$, at which time the holes $c^5$, as well as the holes $c^4$, will be uncovered to admit air to the intake $a$ of the motor. Whenever it is desired to discontinue the braking effect of the motor, the operator will push the knob $d^7$ forwardly until it strikes the head $g^2$ of the sleeve G and thereupon the valve will be restored to its previously regulated position. As a result, the controlling device makes it possible for the operator to open and close the air valve whenever braking is desired, without disturbing the adjustment of the sleeve G which controls the position of the air valve for operating under normal load conditions.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an air controlling device for internal combustion motors, the combination of a valve for controlling the admission of air to the intake of the engine and adapted to progressively increase or decrease the volume of air admitted, and controlling means for said valve comprising a rotatable element for regulating the position of the valve and a device including a knob connected to shift the valve, and to rotate said element and slidable therein independently thereof, to shift the valve to admit additional air without changing the position of said element.

2. In an air controlling device for internal combustion motors, the combination of a valve for controlling the admission of air to the intake of the engine and adapted to progressively increase or decrease the volume of air admitted, and controlling means for said valve comprising a rotatable sleeve for regulating the position of the valve and a device including a knob connected to shift the valve, and to rotate said sleeve and slidable therein independently thereof, to shift the valve to admit additional air without changing the position of said sleeve.

3. In an air controlling device for internal combustion motors, the combination of a valve for controlling the admission of air to the intake of the engine and adapted to progressively increase or decrease the volume of air admitted, and controlling means for said valve comprising a casing, a rotatable stop-sleeve in the casing for regulating the position of the valve, a device including a knob and a stem to rotate said sleeve and slidable in the sleeve independently thereof, and a wire connection between the stem and the valve to shift the valve to admit additional air without changing the position of said sleeve.

4. In an air controlling device for internal combustion motors, the combination of a valve for controlling the admission of air to the intake of the engine and adapted to progressively increase or decrease the volume of air admitted, and controlling means for said valve comprising a casing, a stop-sleeve rotatable in and screw-threaded to the casing, a stem movable in the sleeve, a connection between the stem and the valve for shifting the latter, a connection for rotating the sleeve by the stem, and a knob on the stem whereby it may be rotated to adjust the sleeve and moved independently thereof to shift the valve to admit additional air.

5. In an air controlling device for internal combustion motors, the combination of a valve for controlling the admission of air to the intake of the engine and adapted to progressively increase or decrease the volume of air admitted, and controlling means for said valve comprising a casing, a stop-sleeve rotatable in and screw-threaded to the casing, a stem slidable longitudinally in the sleeve, a connection between the stem and the valve for shifting the latter, a connection for rotating the sleeve by the stem, and a knob on the stem whereby it may be rotated to adjust the sleeve, and operated independently thereof to shift the valve to admit additional air.

6. In an air controlling device for internal combustion motors, the combination of a slide-valve for controlling the admission of air to the intake of the engine and adapted to progressively increase or decrease the volume of air admitted, and controlling means for said valve comprising a casing mounted independently of the valve, a stop-sleeve rotatable in and screw-threaded to the casing, a stem slidable longitudinally in the sleeve, a flexible connection between the stem and the valve for shifting the latter, a connection for rotating the sleeve by the stem, and a knob on the stem whereby it may be rotated to adjust the sleeve, and operated independently thereof to shift the valve to admit additional air.

Signed at Dulwich, South Australia, this sixteenth day of August, 1926.

D. OLIPHANT.